United States Patent [19]
Hackett

[11] 3,747,958
[45] July 24, 1973

[54] HITCHING GUIDE AND SHIELD
[76] Inventor: Chester E. Hackett, 104 Isthmus, Coos Bay, Oreg. 97420
[22] Filed: June 14, 1971
[21] Appl. No.: 152,782

[52] U.S. Cl. ............................................. 280/477
[51] Int. Cl. ............................................. B60d 1/00
[58] Field of Search ................................. 280/477

[56] References Cited
UNITED STATES PATENTS
| | | | |
|---|---|---|---|
| 1,626,993 | 5/1927 | Williams | 280/477 |
| 1,807,379 | 5/1931 | Burrows | 280/477 |
| 3,420,549 | 1/1969 | Robinson | 280/477 |

Primary Examiner—Leo Friaglia

[57] ABSTRACT

A shield for use in conjuction with a trailer hitch, the shield being adaptable for guiding the front end of a trailer hitch tongue into alignment over a hitch ball, the device comprising a one piece member including a diamond shaped bottom wall with a transverse extending slot there through for being mounted on the trailer wall shaft, and the member including a pair of angularly upstanding walls to form a corner there between extending upwardly and into which corner the forward end of the trailer hitch tongue is guided.

1 Claim, 5 Drawing Figures

PATENTED JUL 24 1973　　3,747,958
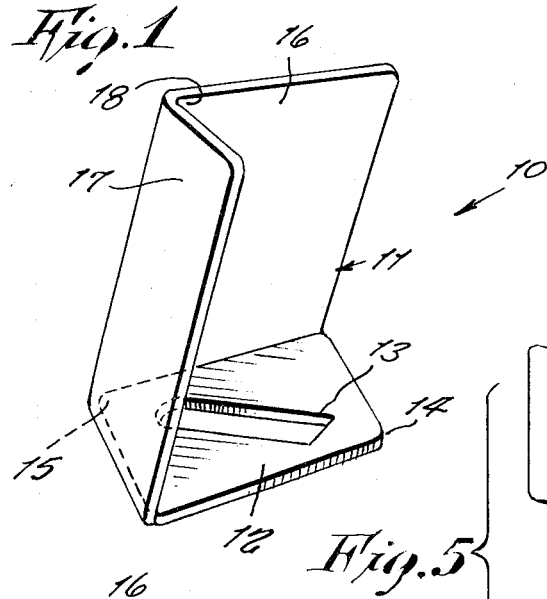
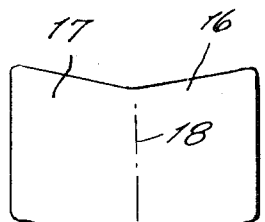
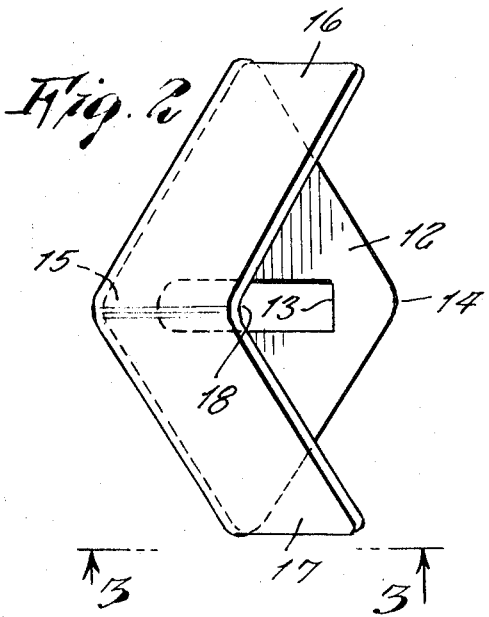
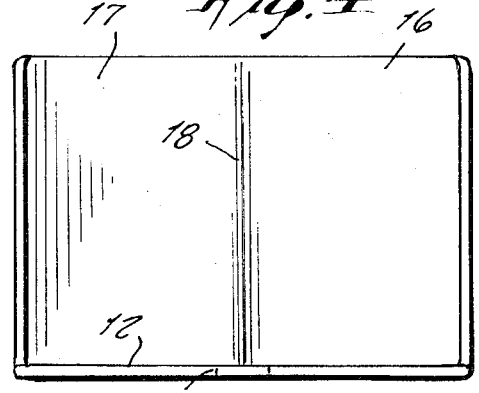
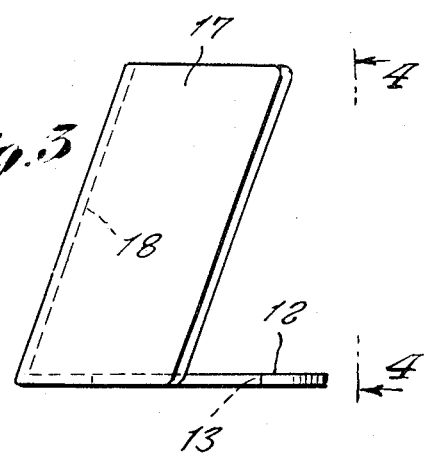
INVENTOR
CHESTER E. HACKETT

HITCHING GUIDE AND SHIELD

This invention relates generally to a trailer hitches. More specifically the present invention relates to trailer hitch accessories.

It is generally well known that it is difficult at times to back up an automotive vehicle to a trailer hitched tongue so as to couple up a house to a towing vehicle.

It is difficult to align the front end of the trailer hitched tongue over the hitched ball so that the automotive vehicle may be brought too far toward either side or maybe brought insufficiently close, or what is even worse is bringing the automotive vehicle excessively too close so that the tongue can be bumped with possible damage to the automobile body finish. This situation is of course objectionable and therefore in want of improvement.

Accordingly it is the principal object of the present invention to provide a device readily attachable to a trailer hitch and which have self-contained means for guiding the trailer hitch tongue into an alignment for securement to the ball hitch.

Another object of the present invention is to provide a hitching facilitating guide and shield which includes a pair of diagonally upstanding walls with an acute extending corner there between and into which the front end of the trailer hitch tongue is guided as the automotive vehicle is backed toward the tongue.

Yet another object of the present invention is to provide a hitching facilitating guide and shield which accordingly will prevent backing the automotive vehicle excessively too far and thereby preventing damage to the automobile body from the tongue.

Yet another object of the present invention is to provide a hitching facilitating guide and shield which can be made adaptable to a variety design of trailer hitches and which can be quickly and easily utilized.

Other objects of the present invention are to provide a hitching facilitating guide and shield which is simple in design, inexpensive to manufacture, rugged in construction, easy to use and efficient in operation.

These and other objects will be readily evident upon a study of the following specification and accompanying drawing wherein:

FIG. 1 is a perspective view of the present invention,

FIG. 2 is a top plan view thereof, and

FIG. 3 is a side view thereof taken on line 3—3 of FIG. 2.

FIG. 4 is a view in direction taken on the line 4—4 of FIG. 3.

FIG. 5 is a flat pattern view of parts of the invention.

Referring now to the drawing in detail, the reference numeral 10 represents a hitching facilitating guide and shield according to the present invention wherein there is a one piece member 11 that is readily mountable upon the rear end of an automotive towing vehicle, the device including a generally diamond configurated bottom wall 12 made of a roll of steel, the bottom wall 12 having transverse extending slot 13 there through, the slot 13 being made along an imaginary line extending between opposite diagonally corners 14 and 15 of the bottom wall 12.

A pair of diagonally upward upstanding side walls 16 and 17 are formed likewise of roll steel material, the lower edges of the side walls being secured integrally to adjacent side edges of the bottom wall 12 by means of a welded seam. THe upstanding adjacent side walls 16 and 17 form a longitudinally extending corner edge 18 there between which at its lower end meets with the corner 15 of the bottom plate or wall 12.

The roll steel material used in the construction of the hitching facilitating guide and shield can be approximately 3/16 of an inch in thickness. The side walls 16 and 17 may be made of a singular roll steel plate which is bent at an angle so to form the longitudinal extending corner edge 18.

For the device of the invention to be mounted in operative use as a hitching guide and shield adjacent a ball type hitch, the shaft of the two-hitch ball normally securable to the rear end of the towing vehicle is inserted downwardly through the slot 13 and fastened with the base of the ball member overlying the wall 12 and the V-shaped corner edge 18 being oriented the forward direction of the vehicle. Thus when the automobile is backed rearwardly a trailer hitch tongue, the forward end of the trailer hitch tongue strikes the upstanding side walls 16 and 17 and is guided toward the corner edge 18 as the automobile is advanced slightly backward so that the socket of the hitched tongue is brought directly in alignment over the ball after which it can be lowered for securement thereto. The slot 13 permits adjustment forwardly and rearwardly of the Hit-A-Hitch in respect to the hitch ball.

Thus there is provided a guide mountable adjacent the automobile coupling so that when backing up engages the upstanding walls of the shield and is guided toward the trailer hitch touches the V-shaped corner edge of the device wherein it is in alignment with the automobile coupling for hitching up. All that is necessary is to drop the trailer hitch member down on the ball and the hitch is completed.

What I now claim is:

1. In a hitching facilitating guide and shield, the combination of a bottom wall and a pair of diagonally upward upstanding walls adjacent each other, said bottom wall being of diamond configuration and being provided with a transverse extending slot therethrough, said slot being located along an imaginary line extending through opposite diagonally positioned corners of said bottom wall, said upstanding side walls having a corner edge therebetween, said corner edge being directly over one of said corners of said bottom wall located along said imaginary line of said slot, so that a trailer hitch tongue at its forward end is guided into said corner edge when said device is carried by an automotive vehicle backing toward said trailer hitched tongue, said diagonally upward walls being inclined over said bottom wall and thus at an acute angle respective to each other, with said corner edge being likewise at an acute angle respective to said bottom wall.

* * * * *